United States Patent [19]

Evans et al.

[11] 4,228,824

[45] Oct. 21, 1980

[54] HOSE

[75] Inventors: Brian Evans; Maurice Calverley, both of Lancaster, England

[73] Assignee: Dunlop Limited, London, England

[21] Appl. No.: 935,755

[22] Filed: Aug. 22, 1978

[30] Foreign Application Priority Data

Aug. 25, 1977 [GB] United Kingdom ............... 35661/77

[51] Int. Cl.³ ............................................. F16L 11/08
[52] U.S. Cl. .................................... 138/119; 138/123
[58] Field of Search ............... 138/124, 119, 126, 125, 138/123; 405/45, 36

[56] References Cited

U.S. PATENT DOCUMENTS

| 2,329,836 | 9/1943 | Huthsing | 138/119 |
| 2,598,022 | 5/1952 | Smith | 138/119 |
| 2,833,313 | 5/1958 | Penman | 138/125 |
| 3,011,525 | 12/1961 | Randle et al. | 138/126 |
| 3,056,429 | 10/1962 | Wilberg | 138/126 |
| 3,939,875 | 2/1976 | Osborn et al. | 405/45 |

*Primary Examiner*—Lenard A. Footland
*Attorney, Agent, or Firm*—Stevens, Davis, Miller & Mosher

[57] ABSTRACT

A layflat type hose having a reinforcement comprising warp elements which extend substantially parallel with the length of the hose and comprise plied yarns of filaments of a high modulus material. The warp elements additionally have a high degree of twist to resist any tendency for the hose to kink when curved.

14 Claims, 1 Drawing Figure

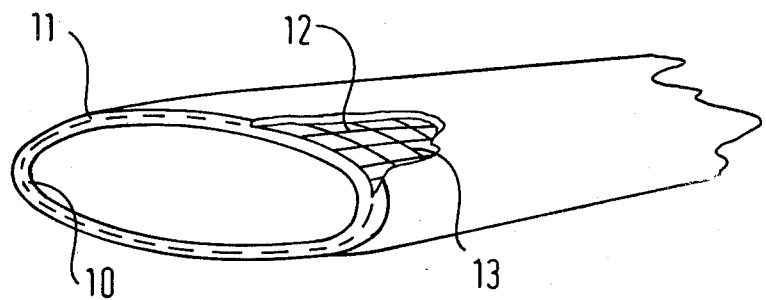

HOSE

This invention relates to hose of the layflat type in which when not in use the hose may be stored in the form of a long length flat strip either coiled around a drum or flaked. The invention relates in particular, though not exclusively, to layflat irrigation hose.

In use of layflat irrigation hose the hose is arranged to extend between a water hydrant and a travelling irrigator head which slowly traverses across the ground which is to be irrigated. In consequence of the traversing movement of the irrigator head, the hose line which commonly comprises a single 660 foot length of hose or two such lengths coupled together generally lies on the ground looped in a U-shape.

In such use it is found that the hose tends to kink at those parts of its length where it is curved, and this tendency is particularly acute when operating at a low internal fluid pressure which does not provide any significant internal resistance to kinking.

In the general hose art there have hitherto been proposed various designs aimed at eliminating kinking, but these are found not suitable for hose of the layflat type and in particular layflat type irrigation hose.

In one proposed construction for eliminating kinking the hose wall is formed with a high modulus characteristic either by use of conventional high modulus materials or a substantial wall thickness but in either case although the hose does have an improved resistance to kinking, by virtue of its stiffness it will not lay flat for coiling in strip form when unpressurized.

Another proposal has been to use a braided type of reinforcement but this has several disadvantages for layflat irrigation hose including being significantly more expensive than conventional layflat irrigation hose having a simple woven reinforcement comprising warp yarns extending substantially parallel to the length of the hose and interwoven with weft yarns extending spirally and substantially circumferentially around the hose. From a technical aspect a braided reinforcement, which gives a structurally stable reinforcement only for a single predetermined relationship between axial and circumferential loadings, is not satisfactory because of the high axial loads intermittently experienced by irrigation hose when being dragged over rough ground. When a pair of standard 660 feet lengths of hose are full of water the externally applied axial load required to drag the hose over rough ground is typically at least 30 times the normal axial load due to hydraulic pressure and any braided reinforcement applied at an angle which would accommodate such externally applied loadings without permitting undue extension of the hose would not adequately restrict radial expansion of the hose and any associated polymeric covering at such times as the externally applied loadings were not present.

It is an object of the present invention to provide a hose of the layflat type which has an improved resistance to kinking.

According to one aspect of the present invention a hose of the layflat type comprises a reinforcement structure comprising warp elements extending along the length of the hose in a direction parallel or inclined to the direction of the length of the hose, the warp elements comprising plied yarns formed of filaments of a high modulus material which resist longitudinal extension of the hose, and said warp elements having a high degree of twist to assist in providing stability to the hose wall when compressed during curving of the hose.

By high modulus material is meant a material having a modulus in excess of 1.2 g/d'tex (grams per decitex) and more preferably in excess of 1.7 g/d'tex, both as measured for a 2% extension.

As used in this specification Modulus at 2% extension is defined as:

$$\frac{\text{Stress in gms at 2\% extension}}{\text{d'tex of yarn tested}}$$

Suitable materials include Diolen 164 S (ex British Enkalon).

By high twist is meant a twist greater than 160 t.p.m. (turns per meter), and preferably greater than 200 t.p.m. A twist in the range 280 t.p.m. to 480 t.p.m. is envisaged as particularly preferably.

The plied yarn may comprise a number of strands, typically 2, 3 or 4 strands each comprised, for example, of a group of 100 or more filaments which may be either twisted together or untwisted. The warp elements may each comprise a single plied yarn or two or more plied yarns twisted together to form a cabled yarn, or cord, the cabled yarns preferably having a twist of at least 160 t.p.m. and said twist preferably being of opposite sense to the twist of the strands in each plied yarn.

Preferably the degree of twist is such that the tubular reinforcement structure per se, i.e. independent of any polymeric or other material in the assembled hose, when loaded by internal pressure of 100 psi has an extensibility in the warp, or axial, direction of at least 0.2% and preferably in the range of 0.3 to 0.6%.

The reinforcement structure preferably incorporates weft elements extending spirally and substantially circumferentially around the hose.

There may be interweaving between the warp and any weft present in the reinforcement structure. In this case the form of interweaving between the warp and weft is preferably such that when incorporated in a hose structure subjected to internal pressure the consequential stressing of the weft elements reduces the effective extensibility of the reinforcement structure in the warp direction below that of the reinforcement structure if loaded only in the warp direction.

In an alternative construction the reinforcement structure may comprise a weft which is not interwoven with the warp elements.

During pressurization of an assembled hose up to pressures in the order of 100 psi, its effective extensibility preferably is less than 1.0% and preferably greater than $-0.5\%$.

To provide the hose with a substantial degree of impermeability the reinforcement structure may be provided with an inner and/or an outer layer of polymeric material which may, for example, be a rubber or thermoplastics material. This material may impregnate any interstices of the reinforcement structure.

Several embodiments of the invention will now be described, by way of example, with reference to the accompanying drawing which shows in part-section a hose constructed in accordance with the present invention.

Referring to the accompanying drawing a layflat water irrigation hose of 4½ inch bore diameter comprises an inner lining layer 10 and outer cover layer 11 both of nitrile/polyvinyl chloride having embedded therebetween and bonded thereto a reinforcement structure comprising warp elements 12 in the form of yarns extending parallel with the direction of the length of the hose and weft elements 13 interwoven with the warp elements and extending spirally and substantially circumferentially relative to the direction of the hose.

The warp elements, being 411 in number and drawn three ends per mail in the woven reinforcement, are each in the form of filamentary cabled yarns comprising two plied yarns twisted together, each plied yarn comprising 3 strands twisted together and each strand in turn comprising a low twist (e.g. 60 t.p.m.) bundle of 1100 d'tex polyester filaments such as Diolen 164S ex British Enkalon. The strands have a twist of 280 t.p.m. in each plied yarn and the plied yarns in turn are twisted, in opposite sense to the strands, at 280 t.p.m. to form the cabled yarn. Warp elements of this kind conventionally are designated, according to B.S. 946: 1970, as cabled yarns of 110 tex Z 60×3Z 280×2 S 280. The weft elements each comprise plied yarns 94 tex t 0×14 S 60 polyamide 6.6 (Nylon type 114 ex I.C.I. Limited) at 25 p.p.m. (picks per meter) and 60 t.p.m. twist. The warp and weft are woven to provide a plain circular woven reinforcement and the warp is given a crimp of 10.8%.

In use of such a hose over the normal pressure range of 50 to 150 p.s.i., the hose is found not to kink at internal pressures greater than 50 p.s.i. and at the higher pressure of 150 p.s.i. the extensibility of the hose is only 0.3%.

In addition it is found that the change of extensibility when pressurizing the hose from 50 p.s.i. to 100 p.s.i. is greater than the change in extensibility when pressurizing from 100 p.s.i. to 150 p.s.i. It is believed this is due to the use of a high modulus material yarn in the warp of at least 1.7 per decitex at 2% modulus as hereinbefore referred and also constructing the yarn as described above (or alternatively fabricating the yarn by doubling with a high twist). Because the reinforcement is impregnated and coated on both sides with a rubber-like thermoplastics material which gives good adhesion to the reinforcement structure, the resultant hose assembly acts in the manner of a spring. During use of the hose which results in it being curved a first part of the hose wall is subject to compression forces and a second part, usually diametrically opposite said first part, is subject to tensile loadings. By virtue of the high twist in the warp elements of the reinforcement structure said first part of the hose wall is able to absorb compression in a stable manner while the lower tensile modulus imparted, at low strain, to the warp elements by the high twist allows the second part to extend relatively readily as compared with a hose having a reinforcement of conventional modulus and twist. Any crimp present in the warp elements assist their aforedescribed movements during curving to further resist any tendency for kinking.

For the 4½ inch diameter hose the preferred extensibility when pressurising between 50 p.s.i. and 100 p.s.i. is in the range −0.1% to 0.2% and the preferred range of extensibility when pressurizing from 100 to 150 p.s.i. is 0.0% to 0.3%.

In practice, in the design of a hose in accordance with the present invention it is found that by choosing the stress/strain properties of the yarn from the modulus of the yarn and its geometrical make-up (in particular twist), there may then be selected the desired range in extensibility between any two pressures in any diameter of hose. Thus, for example, by using a very high modulus fibre and making up a cabled yarn with at least 280×280 twist it is believed possible to provide sufficient resistance to kinking when the hose is used at pressures between 50 and 150 p.s.i. but virtually no extension or possibly even a contraction between 100 and 150 p.s.i. operating pressure. To achieve a contraction in general the tension in weft elements requires to be substantially higher than the tension in the warp elements.

For a 4 inch bore layflat irrigation hose having a reinforcement structure embedded between inner and outer layers of thermoplastic material substantially as described in respect of the preceding embodiment, it is believed that the use of warp and weft elements of the following construction is particularly beneficial:

Warp
370 ends of cabled yarns 110 tex polyester*
Z 60×2 Z 280×2 S 280 drawn 2 ends/mail.
*Diolen 164 S—ex British Enkalon Weft
polyamide 6.6**
320 p.p.m.
94 text t 0×12 S 60
**Nylon 6.6 Type 114—ex I.C.I. Limited Warp crimp 6.7%

The use in accordance with the present invention of a layflat hose reinforcement structure comprising warp elements of a high modulus material and having a high twist level is found to have a second advantage in addition to improving the hose resistance to kinking. In particular hose in accordance with the present invention is found to have an improved resistance to snaking which commonly occurs when conventional layflat hose is internally pressurised. Internal pressurization tends to increase the length of the hose but since the generated stresses and irregular path of the hose on rough ground are such that the hose will not extend solely in the direction of its length the stored energy associated with extension results in a sideways movement of the hose at one or more points along its length. The resulting sideways movement and snaking is particularly undesirable because it can result in the hose damaging crops and fouling the path of the travelling irrigator head; in hose in accordance with the present invention and having a substantially reduced extensibility compared with conventional layflat irrigation hose the snaking effect is substantially eliminated and thus also the associated problems.

Having now described our invention, what we claim is:

1. A hose of the layflat type comprising a reinforcement structure having warp elements extending along the length of the hose in a direction generally parallel to the direction of the length of the hose, the warp elements comprising plied yarns formed of filaments of a material having a modulus greater than 1.2 g/decitex which resist longitudinal extension of the hose, and said warp elements having a twist greater than 160 turns per meter to assist in providing stability to the hose wall when compressed during curving of the hose under hydraulic pressure.

2. A hose according to claim 1 wherein the modulus is as measured for a 2% extension.

3. A hose according to claim 1 wherein the filaments have a modulus greater than 1.7 g/decitex as measured for a 2% extension.

4. A hose according to claim 1 wherein the plied yarns have a twist greater than 200 turns per meter.

5. A hose according to claim 1 wherein the plied yarns have a twist in the range 280 turns per meter to 480 turns per meter.

6. A hose according to claim 1 wherein the warp elements each comprise two or more plied yarns twisted together.

7. A hose according to claim 6 wherein said plied yarns are twisted together with a twist greater than 200 turns per meter.

8. A hose according to claim 6 wherein said plied yarns are twisted together with a twist in the range 160 to 480 turns per meter.

9. A hose according to claim 1 wherein the reinforcement structure incorporates weft elements extending spirally and substantially circumferentially around the hose.

10. A hose according to claim 9 wherein the weft elements and warp elements are interwoven.

11. A hose according to claim 1 having an extensibility in the range −0.5% to 1.0% when subject to an internal pressure of up to 100 p.s.i.

12. A hose according to claim 1 incorporating a tubular reinforcement structure which has an extensibility in the axial direction of at least 0.2% when loaded by an internal pressure of 100 p.s.i.

13. A hose according to claim 12 wherein the extensibility of the tubular reinforcement structure is in the range 0.3 to 0.6%.

14. A hose according to claim 1 wherein the reinforcement structure has interstices impregnated by polymeric material forming an inner or outer layer of the hose.

* * * * *